United States Patent [19]

Ariga

[11] Patent Number: 5,083,536
[45] Date of Patent: Jan. 28, 1992

[54] COMPRESSION PISTON RING GROOVE FOR AN INTERNAL COMBUSTION ENGINE

[75] Inventor: Susumu Ariga, San Antonio, Tex.

[73] Assignee: Southwest Research Institue, San Antonio, Tex.

[21] Appl. No.: 711,157

[22] Filed: Jun. 6, 1991

[51] Int. Cl.$^5$ .............................................. F02F 3/00
[52] U.S. Cl. ............................. 123/193 P; 277/141; 277/143; 277/216
[58] Field of Search ............. 123/193 P; 277/235 B, 277/138, 141, 143, 216, 217, 218, 219, 220, 221, 222, 223, 224; 92/247, 205, 172, 192, 257

[56] References Cited

U.S. PATENT DOCUMENTS

| | | | |
|---|---|---|---|
| 2,600,310 | 6/1952 | Marien | 277/143 |
| 3,522,949 | 8/1970 | Wells | 277/141 |
| 3,615,098 | 10/1971 | Sugahara | 277/143 |
| 3,738,668 | 6/1973 | Minegish | 277/141 |
| 4,422,649 | 12/1983 | Howarth | 277/216 |
| 4,669,369 | 6/1987 | Holt et al. | 123/193 P |

Primary Examiner—Andrew M. Dolinar
Assistant Examiner—M. Macy
Attorney, Agent, or Firm—Baker & Botts

[57] ABSTRACT

An internal combustion engine including a head (29), a cylinder block (20) containing a cylindrical bore (22) and a piston (27). The piston (27) is located within the cylinder bore (22) of the cylinder block (20) for reciprocating motion in the longitudinal direction of the cylinder bore (22). The piston (27) includes at least one annular groove (32) around its circumference in which is fitted a compression piston ring (40). The piston ring (40) forms a gas seal between the piston (27) and wall of the cylinder bore (22). The lateral surface (34) of the piston ring groove nearest the combustion chamber (24) which is formed by the piston (27) and cylinder bore (22), has formed in it a plurality of radially directed channels (38), each channel forming a gap (46) for introducing gas pressure from the combustion chamber (24) through the clearance space (42) between the piston (27) and cylinder bore (22) and into the piston ring groove (32). The combustion gas pressure thus introduced produces a force against the piston ring (40) which keeps it sealed against the surface of the piston ring groove (35) opposite the combustion chamber (24).

14 Claims, 2 Drawing Sheets

COMPRESSION PISTON RING GROOVE FOR AN INTERNAL COMBUSTION ENGINE

TECHNICAL FIELD OF THE INVENTION

The present invention generally relates to an internal combustion engine including a cylinder block and a piston. The cylinder block includes at least one cylinder bore, and a piston is located in each cylinder bore. The piston includes at least one annular groove into which is inserted a piston ring, for the purpose of forming a seal between the piston and the cylinder bore wall.

More particularly, the present invention is concerned with a modification in the annular groove of the piston ring for the purposes of reducing engine oil consumption, reducing blow-by gas flow rate, reducing cylinder wall friction and wear, and for improving the seal between the piston ring and the cylinder wall.

BACKGROUND OF THE INVENTION

A reciprocating internal combustion engine is well-known which comprises, as illustrated in FIGS. 1-4, a cylinder block 20 having a bore 22, a piston 26 arranged in the cylinder bore 22 for reciprocatory motion therein, and a combustion chamber 24 enclosed by the piston 26, cylinder block 20 and a head 29. A sealing device for providing a seal between the piston 26 and the wall of the cylinder bore 22 includes a piston ring 40 fitted into an annular groove 32 formed in the outer peripheral surface 30 of the piston 26. In the conventional design, both the piston ring 40 and the piston ring groove 32 into which the piston ring 40 is fitted have a generally rectangular cross-sectional shape of uniform thickness.

In recent years, however, alternative non-conventional cross-sectional shapes have been proposed for both the piston ring and for the piston groove, for the purpose of overcoming certain disadvantages encountered when using the conventional piston ring and groove design. For example, Tokoro, in U.S. Pat. No. 4,774,917, discloses piston rings and grooves having somewhat L-shaped cross-sections, with one surface of both the ring and groove inclined with respect to the axis of the piston. This design is intended to reduce friction between the piston ring and the cylinder wall, to prevent the top of the piston from melting from the heat in the combustion chamber, and to reduce blow-by gas leakage past the piston ring during the expansion stroke of the engine. Fujikawa, in U.S. Pat. No. 4,346,685,discloses an L-shaped keystone piston ring and similarly shaped groove in the piston. This design is intended to improve sealing between the piston and the cylinder wall and to reduce the possibility of seizing of the ring and groove surface. Neeme, in U.S. Pat. No. 2,638,390, discloses a piston groove of rectangular cross-section, but having a counter groove or cutback in its bottom, and a plurality of radial outlet canals in the sidewall of the groove opposite the combustion chamber. This design is intended to reduce friction and wear on the piston ring and cylinder wall by providing a path for gas and oil to seep behind and around the pisten ring during operation of the engine. Winston, in U.S. Pat. No. 4,883,029, discloses a piston ring and groove having a generally rectangular cross-sectional shape, except for a projection on the ring which interlocks with a recess in the groove. This design is intended to prevent rotation of the piston ring with respect to the piston.

While these alternative piston ring and groove designs may be somewhat effective in accomplishing the purpose for which they were intended, an inherent disadvantage remains with all the prior art designs. There is a tendency, as illustrated in FIG. 3, for the piston ring 40, during engine operation, to become seated on the sidewall surface 34 of the groove 32 nearest the combustion chamber 24 either because of a higher gas pressure on the opposite side of the piston ring 40 or for other reasons. A piston ring seated on the groove surface 34 has several undesirable effects on engine performance. First, there is an increased probability that oil will be scraped up by the piston ring 40 to the combustion chamber 24 resulting in higher oil consumption. Second, the increased heat flow from the combustion chamber 24 to the piston ring 40, and the resultant higher temperature gradient across the piston ring 40, sometimes causes the piston ring 40 to become twisted in its groove 32 as illustrated in FIG. 4. This twisting reduces the surface area contact between the piston ring 40 and the cylinder bore wall 22, which increases the leakage of both blow-by gas and lubricating oil 54 past the piston ring 40. A twisted piston ring 40 also undermines the seal between the piston ring 40 and the cylinder bore wall 22, and increases friction and wear on the cylinder bore wall surface 22.

Consequently, a need exists for an improved piston ring and groove design which reduces the possibility of the piston ring seating against the top surface of its groove during engine operation.

SUMMARY OF THE INVENTION

The present invention provides, for a piston in a reciprocating internal combustion engine, a piston ring groove design which answers the aforementioned needs. According to the invention, there is provided a reciprocating internal combustion engine comprising, among other components, a cylinder block, a piston and a piston ring. The cylinder block includes at least one cylinder bore, and each cylinder bore includes a cylinder bore surface. A piston is located within each cylinder bore of the cylinder block, and a combustion chamber is defined by the top or crown surface of the piston, the inner surface of the cylinder bore and an engine head that closes one end of the bore. The piston includes at least one annular groove, in which is located a compression piston ring for providing a gas seal between the outer peripheral surface of the piston and the inner surface of the cylinder bore.

The improvement presented by this invention resides in the configuration of the annular piston ring groove around the periphery of the piston. The sidewall surface of the groove nearest the crown of the piston, and nearest the combustion chamber of the engine, has formed in it a plurality of radially directed channels or similar depressions. These channels in the groove sidewall present a notched configuration to one edge of the groove opening. The piston ring, however, does not conform in shape to the groove surface by having mating projections on its surface. Rather, the piston ring is of the conventional, rectangular cross-section, and is of uniform thickness around its circumference. Therefore, when the piston ring is inserted in the groove, a series of gaps are formed between the piston ring and the groove surface nearest the combustion chamber.

Accordingly, during engine operation, the channels in the groove surface are open to and in communication with the clearance space between the piston and the cylinder wall. Thus, combustion chamber gas pressure is exerted through the clearance space between the piston and cylinder wall and into the channels in the groove surface on the combustion chamber side of the piston ring. This pressure produces a force against the piston ring in a direction opposite the channels in the groove, which force keeps the piston ring seated against the groove surface opposite the combustion chamber. The above-identified undesirable effects encountered when the piston ring becomes seated against the groove surface nearest the combustion chamber are thus eliminated.

Other features and advantages of the invention will become apparent to those skilled in the art upon review of the following detailed description, claims and drawings.

BRIEF DESCRIPTION OF THE DRAWINGS

For a more complete understanding of the present invention, and the advantages thereof, reference is now made to the following description taken in conjunction with the accompanying drawings, in which.

DESCRIPTION OF THE PREFERRED EMBODIMENT

The preferred embodiment of the present invention and its advantages are best understood by referring to FIGS. 5–10 of the drawings, like numerals being used for like and corresponding parts of the various drawings.

Figure 1:
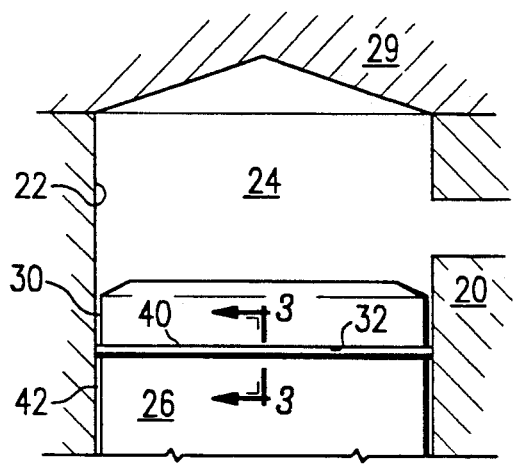
FIG. 1 is a side elevational view, partially in cross-section, of an internal combustion engine cylinder block bore containing a conventional piston and piston ring of the prior art.
Figure 2:
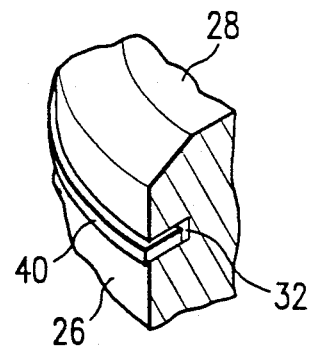
FIG. 2 is an enlarged, fragmentary perspective view of a peripheral portion of the prior art piston of FIG. 1, showing the piston ring groove and piston ring installed therein.
Figure 3:
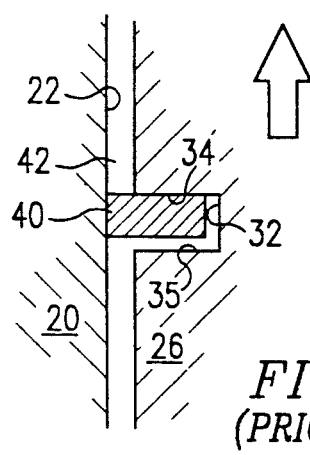
FIG. 3 is an enlarged, fragmentary cross-sectional view taken along line 3—3 in FIG. 1, showing the piston ring seated against the lateral surface of the piston ring groove nearest the combustion chamber.
Figure 4:
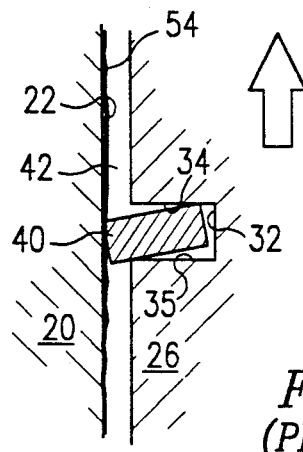
FIG. 4 is a view similar to FIG. 3, but showing the deformed position the piston ring can assume when installed in a piston ring groove of the prior art.
Figure 5:
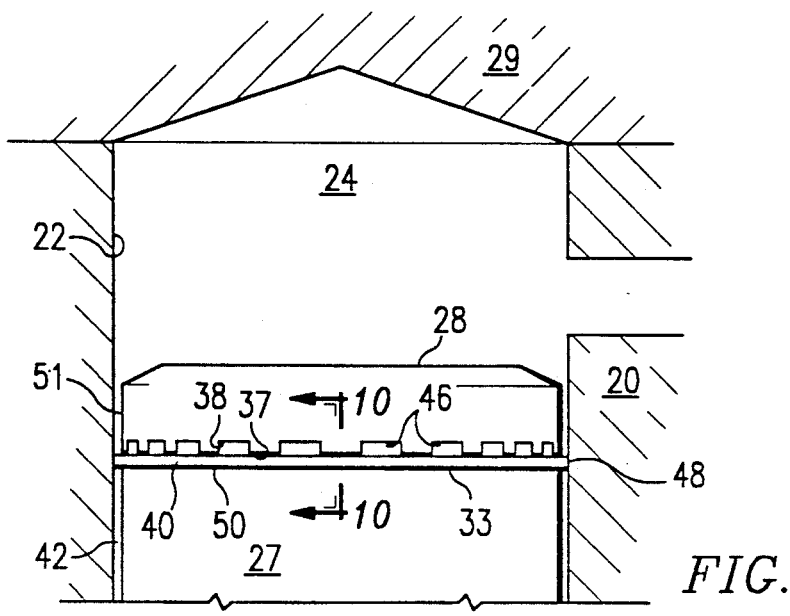
FIG. 5 is a side elevational view, partially in cross-section, of one embodiment a piston and piston ring conforming with the invention, in a cylinder block bore.

FIG. 5 illustrates the preferred embodiment of the invention wherein the internal combustion engine comprises a cylinder block 20 having the bore 22 formed therein. A piston 27 is arranged in the cylinder bore 22 for reciprocatory movement therein. The combustion chamber 24 is enclosed by the piston 27, the cylinder bore 22 in the cylinder block 20, and by the head 29. A compression or piston ring 40 is fitted into an annular piston ring groove 33 that encircles the periphery of the piston 27.

To facilitate easy installation and removal of the piston ring 40 from the piston 27, the groove 33 is made slightly wider than the thickness of the piston ring 40. This oversizing of the groove width produces a clearance space or gap 44 between the piston ring 40 and the groove sidewall surface 37, as is most clearly seen in FIG. 10. This gap 44 permits the piston ring 40 to move axially of the piston 27 within the groove 33. When the piston 27 and piston ring 40 are fitted into the cylinder bore 22, an outer circumferential surface 48 of the piston ring 40 contacts the cylinder bore wall 22. A lower surface 50 of the piston ring 40 contacts a bottom surface 35 of the piston ring groove 33. The piston ring 40 thus forms a seal between the piston 27 and the cylinder bore wall 22.

Figure 6:
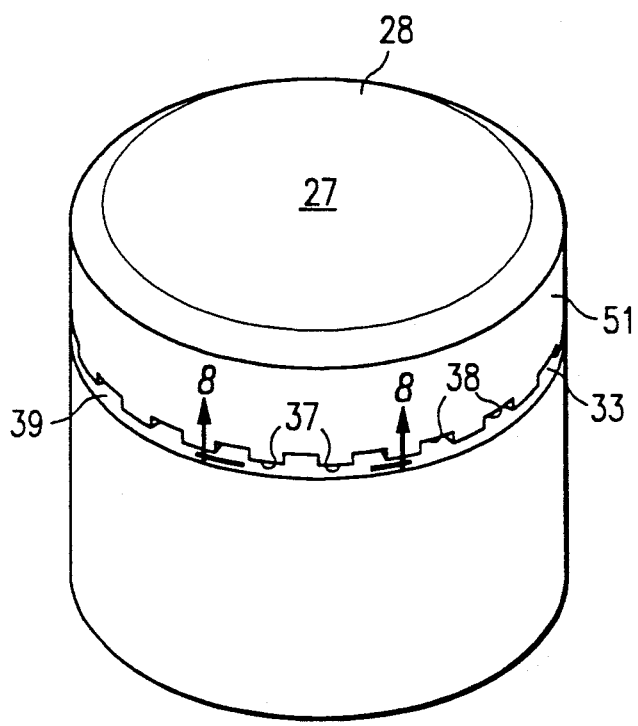
FIG. 6 is a perspective view of the piston of FIG. 5.
Figure 8:
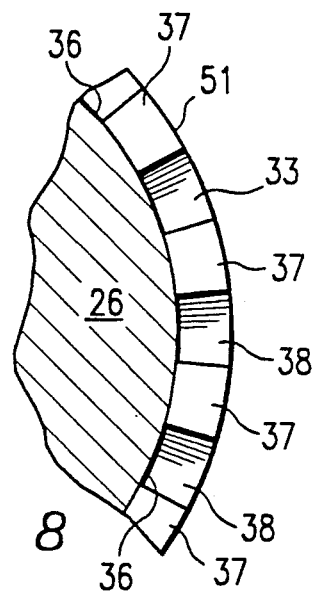
FIG. 8 is a fragmentary cross-sectional view taken along line 8—8 in FIG. 6, showing the radial channels in the groove surface nearest the piston crown.
Figure 9:
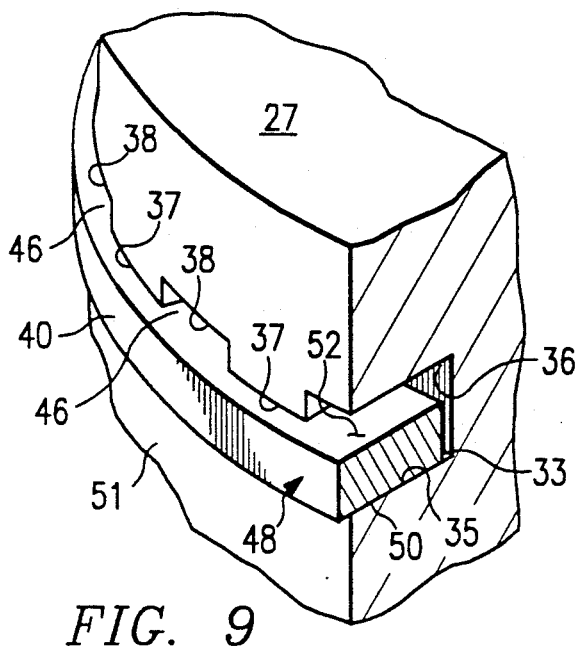
FIG. 9 is an enlarged, fragmentary perspective view of a peripheral portion of a piston and piston ring groove embodying the invention.

As is more clearly shown in FIGS. 6 and 9, the upper surface 37 of the piston ring groove 33 nearest the combustion chamber 24 has formed in it a plurality of radially directed depressions or channels 38 extending from the outer peripheral surface 51 of the piston 27 to the bottom of the surface 36 of the groove 33. These radial channels 38 in the upper sidewall surface 37 thus present a notched configuration to one edge of the groove opening.

Figure 7:
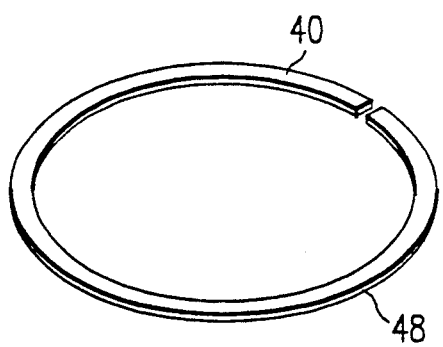
FIG. 7 is a perspective view of a conventional piston ring that can be utilized in the invention.
Figure 10:
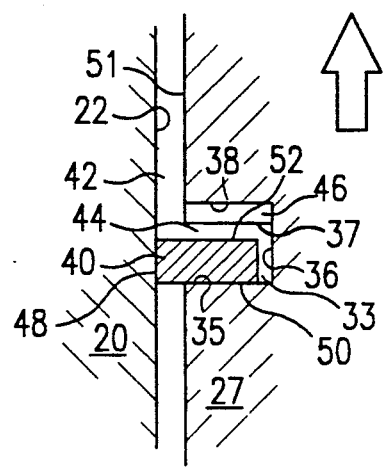
FIG. 10 is an enlarged, fragmentary, cross-sectional view taken along line 10—10 in FIG. 5, showing the piston ring seated against the lateral surface of the piston ring groove farthest from the combustion chamber.

As shown in FIG. 7, the piston ring 40, which is split, has a rectangular cross-section and uniform thickness around its circumference, in the conventional design of a piston ring. As shown in FIGS. 5 and 9, when the piston ring 40 is installed in the piston ring groove 33, the channels 38 in the upper surface 37 define a series of gaps 46 between the piston ring 40 and the groove lateral surface or sidewall 37. These gaps 46 are maintained in communication with the combustion chamber 24 through the clearance space 42 between the piston 27 and the cylinder bore wall 22. The communication between gaps 46 and clearance space 42 is best seen in FIG. 10.

When the engine is in operation, the piston 27 is impelled downwardly within the cylinder bore 22 by the expansive force produced by the combustion of a fuel-air mixture in the combustion chamber 24. The outer circumferential surface 48 of the piston ring 40 thus makes sliding contact with the inner surface of the cylinder bore 22. Pressurized gas from the combustion chamber 24 flows into the clearance space 42 and into the gaps 46 between the piston ring 40 and upper surface 37. The gas pressure produces a force on an upper piston ring surface 52 to urge the piston ring 40 to move axially of the piston 27 toward the opposite lateral surface 35 of the piston ring groove 33. Thus, combustion gas pressure is maintained on the piston ring surface 52 nearest the combustion chamber 24.

When the piston ring 40 is seated against the lateral surface 35 of the ring groove 33 opposite the combustion chamber 24, combustion gas pressure is distributed over the entire piston ring surface 52 through the clearance space 44 attributable to the oversizing of the width of the groove 33 with respect to the ring 40 thickness. If the piston ring 40 should become seated against the channelled surface 37 of the ring groove 33, gas pressure is still maintained on a substantial part of the piston ring 40 through the gaps 46. The force exerted by that pressure urges the piston ring 40 away from the channelled groove surface 37, and in so doing exposes the surface 52 of the piston ring 40 to the combustion gas pressure. In this way, the piston ring 40 is kept seated against the groove surface 35 opposite the combustion chamber 24 at all times while the engine is in operation.

When seated against the groove surface 35, the piston ring 40 is subjected to a reduced temperature on its lower surface 50 and a reduced temperature gradient across its thickness, with a corresponding reduction in heat flow through the ring 40. The lower temperature gradient reduces the tendency of the ring 40 to twist or to warp within the groove 33, with the concomitant loss of surface contact between the ring 40 and the cylinder bore wall 22. The improved surface contact between the ring 40 and the cylinder bore wall 22 resulting from this invention reduces engine oil consumption, blow-by gas flow rate, and friction and wear on the piston ring 40 and cylinder bore wall 22.

The improved internal combustion engine sealing apparatus and method of the present invention, and many of its intended advantages, will be understood from the foregoing description and it will be apparent that various changes may be made in the form, construction and arrangement of the parts thereof without departing from the spirit and scope of the invention, or sacrificing all of its material advantages, the form hereinbefore described being merely a preferred or exemplary embodiment thereof.

What is claimed is:

1. An improved internal combustion engine including a cylinder block having a bore providing an interior, cylindrical surface in said block, a head closing one end of said bore, a cylindrical piston having a top surface and an annular peripheral surface spaced from the interior cylindrical surface of said block to provide a clearance space and arranged in said cylinder block bore for reciprocating movement therein, and a combustion chamber defined by the top surface of said piston, said cylinder block and said head, said improvement comprising:
   a piston ring; and
   a piston ring groove formed in the peripheral surface of the piston for receiving said piston ring, said groove being defined by first and second spaced lateral surfaces, said first lateral surface being located nearest the combustion chamber and including a plurality of radially directed spaced channels therein, each of said channels forming a passage for gas to be introduced from the combustion chamber through the clearance space between the piston and interior cylindrical surface of said block to the surface of said piston ring to bias said ring toward said second lateral surface of said groove.

2. In an improved reciprocating internal combustion engine including a cylinder block having a bore providing an interior cylindrical surface in said block, a head closing one end of said bore, a cylindrical piston having a crown surface and a curved circumferential surface spaced from the interior cylindrical surface of said block to provide a clearance space and fitted in said cylinder block bore for reciprocating motion therein, an annular groove in said circumferential surface of said piston having two lateral surfaces, a piston ring fitted in said groove, and a combustion chamber formed by the crown surface of said piston, said cylinder block and said head, the improvement comprising:
   a plurality of radially directed channels in the lateral surface of said groove located nearest said combustion chamber, said channels opening into the clearance space between said piston and said interior cylindrical surface of said block.

3. In a reciprocating internal combustion engine including a cylinder block having a bore providing an interior cylindrical surface in said block, a head closing one end of said bore, a piston having a top surface and a curved peripheral surface fitted in said bore for reciprocating motion therein, and a combustion chamber formed by the top surface of said piston, said head and said cylinder block, an improved seal between said piston and said cylinder block comprising:
   an annular groove in said peripheral surface of said piston, said groove having first and second lateral surfaces, said first surface being located nearest said combustion chamber and said second surface being located farthest from said combustion chamber;
   a piston ring located in said groove and having an upper surface nearest said combustion chamber; and
   means in said piston for exposing a substantial part of said upper surface of said piston ring to the gas pressure in said combustion chamber and for maintaining said gas pressure on a substantial part of said upper surface to urge said piston ring toward said second lateral surface of said groove.

4. The improved seal of claim 3, wherein said piston ring and annular groove have a generally rectangular cross-section.

5. The improved seal of claim 3, wherein said means in said piston for exposing a substantial part of said upper surface of said piston ring to said gas pressure in said combustion chamber and for maintaining said gas pressure on a substantial part of said upper surface of said piston ring to urge said ring toward said second lateral surface of said groove consists of a plurality of radially directed channels in said first lateral surface of said groove and a clearance space between said piston and said interior cylindrical surface of said cylinder block.

6. The improved seal of claim 5, wherein said channels are evenly spaced around the circumference of said piston, and wherein the width of each channel is substantially equal to the distance between the channels.

7. A piston having a top surface and a curved peripheral surface, said piston having in its peripheral surface a compression ring groove defined in part by a pair of lateral surfaces for receiving a compression ring, the lateral surface nearest the top surface of said piston having circumferentially spaced, radial extending depressions therein for providing gas pressure distribution channels.

8. An improved piston for a reciprocating internal combustion engine having a cylinder block with a bore providing an interior cylindrical surface in said block, a head closing one end of said bore, a compression ring for sealing a combustion chamber defined by said piston, said cylinder block and said head, and a clearance space between said piston and said interior cylindrical surface of said block, said piston including:
   a top surface and a curved peripheral surface;
   an annular groove having two lateral surfaces in said peripheral surface for receiving said compression ring; and
   a plurality of radially directed channels in the lateral surface of said groove nearest said combustion chamber, said channels opening into the clearance space between said piston and said cylinder block.

9. A sealing arrangement for a piston having a top surface and a curved peripheral surface and a cylinder block bore in a reciprocating internal combustion engine having a head closing one end of said cylinder block bore, a combustion chamber defined by the top surface of said piston, said head, and said cylinder block, the sealing arrangement comprising:

an annular groove in the peripheral surface of said piston;

a piston ring fitted in said groove having a surface closer to said combustion chamber;

means for exposing a substantial part of said surface of said piston ring to the gas pressure in said combustion chamber and for maintaining said gas pressure on said substantial part of said surface of said piston ring, wherein said means for exposing a substantial part of said surface of said piston ring to said gas pressure in said combustion chamber and for maintaining said gas pressure on a substantial part of said surface of said piston ring includes a plurality of radially directed channels in the surface of said groove nearest said combustion chamber, and a clearance space between said piston and said cylinder block.

10. The sealing arrangement of claim 9, wherein said piston ring and annular groove have a generally rectangular cross-section.

11. The sealing arrangement of claim 9, wherein said channels are evenly spaced around the circumference of said piston, and wherein the width of each channel substantially equals the distance between the channels.

12. In combination, an engine block having a cylinder bore, a head closing one end of said bore, a piston having a top surface and a curved peripheral surface fitted in said cylinder bore for reciprocating motion therein, a combustion chamber enclosed by said piston, said head and said engine block, a compression ring groove having two side walls in the peripheral surface of said piston, a compression ring mounted in said groove, and means forming a plurality of outwardly opening pressure distribution channels in the side wall of said groove nearest said combustion chamber.

13. A method for reducing blow-by gas flow rate and oil consumption in a reciprocating internal combustion engine including a cylinder block having a bore providing an interior, cylindrical surface in said block, a head closing one end of said bore, a piston fitted in said cylinder block bore for reciprocating motion therein, a clearance space between said piston and said interior, cylindrical surface in said block, and a combustion chamber formed by said piston, head, and cylinder block, comprising the steps of:

forming an annular groove having two lateral surfaces in the outer periphery of said piston;

forming a plurality of radially directed channels in the lateral surface of said groove nearest said combustion chamber, said channels opening into said clearance space, and communicating with said combustion chamber through said clearance space; and locating a piston ring in said groove.

14. In a reciprocating internal combustion engine including a cylinder block having a bore providing an interior, cylindrical surface in said block, a head closing one end of said bore, a piston having a top surface and a curved peripheral surface fitted in said bore for reciprocating motion therein, a clearance space between said piston and said interior, cylindrical surface in said block, an annular groove having two lateral surfaces in said peripheral surface of said piston, a piston ring having two lateral surfaces located in said groove, and a combustion chamber formed by the top surface of said piston, said head, and cylinder block, a method for exposing a substantial part of said surface of said piston ring nearest said combustion chamber to the gas pressure within said combustion chamber, and for preventing the piston ring from seating against said lateral surface of said piston ring groove nearest said combustion chamber, said method including:

forming a plurality of radially directed channels in the lateral surface of said groove nearest said combustion chamber, said channels opening into said clearance space between said piston and said interior, cylindrical surface in said block, and communicating with said combustion chamber through said clearance space.

* * * * *

UNITED STATES PATENT AND TRADEMARK OFFICE
CERTIFICATE OF CORRECTION

PATENT NO. : 5,083,536
DATED : January 28, 1992
INVENTOR(S) : Susumu Ariga

It is certified that error appears in the above-identified patent and that said Letters Patent is hereby corrected as shown below:

Abstract, in the next to the last line, after "it", delete "sealed" and insert -- seated --.

Signed and Sealed this

Twenty-eighth Day of September, 1993

Attest:

BRUCE LEHMAN

Attesting Officer　　　　Commissioner of Patents and Trademarks